(12) United States Patent
Nakayama et al.

(10) Patent No.: US 6,705,154 B2
(45) Date of Patent: Mar. 16, 2004

(54) CANTILEVER FOR VERTICAL SCANNING MICROSCOPE AND PROBE FOR VERTICAL SCAN MICROSCOPE

(75) Inventors: Yoshikazu Nakayama, 9-404, 14-2, Korigaoka 1-Chome, Hirakata (JP), 573-0084; Seiji Akita, Izumi (JP); Akio Harada, Osaka (JP); Takashi Okawa, Osaka (JP); Yuichi Takano, Osaka (JP); Masatoshi Yasutake, Sunto-gun (JP); Yoshiharu Shirakawabe, Sunto-gun (JP)

(73) Assignees: Yoshikazu Nakayama, Osaka (JP); Daiken Chemical Co., Ltd., Osaka (JP); Seiko Instruments, Inc., Chiba (JP)

( * ) Notice: Subject to any disclaimer, the term of this patent is extended or adjusted under 35 U.S.C. 154(b) by 0 days.

(21) Appl. No.: 10/182,363
(22) PCT Filed: Sep. 28, 2001
(86) PCT No.: PCT/JP01/08613
§ 371 (c)(1),
(2), (4) Date: Jul. 26, 2002
(87) PCT Pub. No.: WO02/42742
PCT Pub. Date: May 30, 2002

(65) Prior Publication Data
US 2003/0010100 A1 Jan. 16, 2003

(30) Foreign Application Priority Data
Nov. 26, 2000 (JP) .................................... 2000-403558

(51) Int. Cl.⁷ .............................................. G01N 21/00
(52) U.S. Cl. ....................................................... 73/105
(58) Field of Search .............................. 73/105; 250/306, 250/307

(56) References Cited

U.S. PATENT DOCUMENTS

| | | | | |
|---|---|---|---|---|
| 5,223,713 A | * | 6/1993 | Uozumi et al. | 250/306 |
| 6,146,227 A | * | 11/2000 | Mancevski | 445/24 |
| 6,159,742 A | * | 12/2000 | Lieber et al. | 436/164 |
| 6,519,221 B1 | * | 2/2003 | Manalis et al. | 369/126 |
| 6,528,785 B1 | * | 3/2003 | Nakayama et al. | 250/306 |

FOREIGN PATENT DOCUMENTS

| | | |
|---|---|---|
| EP | 1 054 249 A1 | 11/2000 |
| JP | H6-123621 | 5/1994 |
| JP | H11-326348 | 11/1999 |
| JP | 2000-227435 | 8/2000 |
| JP | 2000-249712 | 9/2000 |
| JP | 2000-321292 | 11/2000 |
| JP | 2000-346786 | 12/2000 |
| JP | 2001-68052 | 3/2001 |
| WO | WO00/33052 | 6/2000 |

* cited by examiner

Primary Examiner—Robert Raevis
(74) Attorney, Agent, or Firm—Koda & Androlia

(57) ABSTRACT

A cantilever for a vertical scanning type microscope that obtains substance information of a surface of a specimen by a tip end of a nanotube probe needle fastened to the cantilever, in which the cantilever has a fixing region to which a base end portion of a nanotube serving as a probe needle is fastened, and a height direction of the fixing region is set to be substantially perpendicular to a mean surface of the specimen when the cantilever is disposed in a measuring state with respect to the mean surface of the specimen; and the base end portion of the nanotube is bonded in the height direction of the fixing region.

9 Claims, 10 Drawing Sheets

CANTILEVER FOR VERTICAL SCANNING MICROSCOPE AND PROBE FOR VERTICAL SCAN MICROSCOPE

TECHNICAL FIELD

The present invention is related to a probe for a scanning type microscope which obtain substance information from a surface of a specimen by using a nanotube as a probe needle, saying in more detail, being related to a cantilever for a high quality scanning type microscope and a probe for a high quality scanning type microscope using the cantilever, which can obtain substance information from a surface of a specimen, and in which a nanotube probe needle is disposed substantially vertically against the surface of a specimen.

BACKGROUND ART

In order to image a surface structure of a specimen by an atomic force microscope abbreviated as AFM, a probe needle needed which is caused to contact with the surface of the specimen and obtains signals. In the past, as this probe needle, a silicon cantilever was known, which possesses a protruding portion with a sharp tip end such as a pyramid or a cone (called pyramidal portion).

In recent year, a carbon nanotube has been discovered as a carbon matter having a new structure. The carbon nanotube is from about 1 nm to several 10 nm in diameter and several μm in length, and its aspect ratio is around 100–1000. It is difficult to form a probe needle of 1 nm diameter by means of the present of semiconductor technique. Therefore, in this respect, the carbon nanotube provides best condition for the probe needle for the AFM.

In such a situation, H. Dai and others published, in the *Nature* magazine (Vol.384, Nov. 14, 1996), a report with respect to the AMF probe in which a carbon nanotube is stuck on the tip end of the protruding portion of a cantilever. Though the probe proposed by them was of epoch-making, the carbon nanotube fell off from the protruding portion during repeatedly scanning surfaces of specimens, since the carbon nanotube was simply stuck on the protruding portion.

In order to solve this weak point, the present inventors have achieved to develop a method fastening firmly the carbon nanotube to the protruding portion of the cantilever. Results of this invention have been published; the first fastening method is disclosed in Japanese Patent Application Laid-Open (Kokai) No. 2000-227435, and the second fastening method is disclosed in Japanese Patent Application Laid-Open (Kokai) No. 2000-249712.

The fist fastening method above-mentioned is that a coating film is formed by means of irradiating an electron beam to the base end portion of a nanotube, and next the nanotube is fastened to the cantilever by means of coating the nanotube with the coating film. The second method is that the base end portion of the nanotube is fusion-fastened to the protruding portion of the cantilever by means of irradiating an electron beam on the base end portion of the nanotube or by means of flowing current.

However, the resolution of detection of signals is often reduced according to a disposition of a nanotube, even if the nanotube is fastened to the protruding portion of a conical form cantilever.

FIG. 14 shows a stereo-structure diagram of a probe of a conventional scanning type microscope. The probe 20 of the scanning type microscope comprises a cantilever 2 and a nanotube 12. This cantilever 2 comprises a cantilever portion 4, its fastening rear portion 6 and a protruding portion 8 (called pyramid portion) of the forward end, and the protruding portion 8 possesses a sharp tip end 8a which serves as a probe needle. Though a base end portion of the nanotube 12 is fastened to the protruding portion, it is, in many cases, not fastened, passing the tip end 8a as shown in the diagram, since a high technique is needed in order to fasten so as to pass the tip end 8a.

In scanning a specimen surface 24 of a specimen 22 by means of this probe 20, the nanotube tip end 18 and the tip end 8a of the protruding portion both act as probe needles. In a surface image obtained by this probe, the image obtained by the tip end 18 of the nanotube and the image obtained by the tip end 8 of the protruding portion both overlap with each other, so that the degree of sharpness of the image itself is caused to reduce.

FIG. 15 is a stereo-structure diagram of another conventional scanning type microscope. In this conventional example, the action of the tip end 8a of a protruding portion as a probe needle is blocked, since a nanotube 12 passes the tip end 8a of protruding portion.

However, when this nanotube tip end 18 is caused to contact with the specimen surface 24, the nanotube 12 is not orthogonal, but is oblique with an oblique angle φ against a mean surface 26 of the specimen surface 22. The nanotube tip end 18 can not follow sharp indentations and projections of the specimen surface 24 in oblique states, so that non-detected black regions a That is, also in this case, the reduction of detection resolution is inevitable.

These weak points are caused by the reason that the conventional protruding portion 8 of the cantilever is formed in a pyramidal fashion, so that the protruding portion necessarily possesses the sharp tip end 8a. In other ward, if the conventional probe needle for the AFM is used in intact state, these weak points come out.

Accordingly, an object of the present invention is to realize a probe for a vertical scanning type microscope, in which a protruding portion of a cantilever does not possess a sharp tip end and furthermore, during detection, a nanotube tip end substantially perpendicularly abuts against a specimen surface.

DISCLOSURE OF INVENTION

The present invention provides, in a probe for a scanning type microscope which obtains substance information of a specimen surface by means of a tip end of a nanotube probe needle fastened to a cantilever; a cantilever for a vertical scanning type microscope characterized in that a fixing region, to which a base end portion of a nanotube is fastened, is provided in a cantilever, and the fixing region is set so that height direction of the above described fixing region is kept perpendicular against a specimen surface when the cantilever is set in a measuring state for the specimen surface.

The present invention provides the cantilever for a vertical scanning type microscope described in the first part of the present invention in which the above described fixing region is a fixing plane.

The present invention provides a fixing hole of the above described fixing region, into which the base end portion of the nanotube is inserted, and a cantilever for the vertical scanning type microscope described in the first part of the present invention, in which the axis direction of the fixing hole accords with the height direction above described.

The present invention provides the cantilever for the vertical scanning type microscope described in the first part of the present invention, wherein the above described fixing region is a fixing gap to which the base end portion of the nanotube is inserted to fit and the gap direction of this fixing gap accords with the height direction above described.

The present invention provides the cantilever for the vertical scanning type microscope described in the first part of the present invention, in which the above described fixing region is an edge line portion and the direction of this edge line accords with the height direction above described.

The present invention provides the cantilever for the vertical scanning type microscope described in the first part of the present invention, wherein the above described fixing region is a fixing curved-surface and the cantilever is settled so that and the height direction of a tangent plane of the fixing curved surface above described is perpendicular against a specimen surface, when the cantilever is set in measuring state.

The present invention provides the cantilever for the vertical scanning type microscope described in the first part of the present invention, by which the above described fixing region is formed by utilizing focused-ion-beam process, etching process, or deposition process.

The preset invention provides, in a probe for the vertical scanning type microscope which obtains substance information of a surface of specimen by a tip end of a nanotube probe needle fastened to the cantilever; the probe for the vertical scanning type microscope characterized in that a fixing region, to which a base end portion of a nanotube is fastened, is provided in the cantilever, and the fixing region is set so that height of direction of the above described fixing region is kept perpendicular against a surface of specimen, when the cantilever is set in a measuring state for the surface of a specimen, and the base end portion of the nanotube is fastened in the height direction of this fixing region.

The present invention provides the probe for the vertical scanning type microscope described in the eighth part of the present invention, wherein the axis line of the above described nanotube is at an angle of about (θ+90) degrees with an axis direction of the cantilever portion, when the axis direction of the cantilever portion of the above described cantilever is set in measuring state, in a backward rising fashion, at the angle θ against a surface of a specimen.

BEST MODE FOR CARRYING OUT THE INVENTION

In the following, modes for a cantilever for a vertical scanning type microscope and a probe for a vertical scanning type microscope using this cantilever, which are related to the present invention, will be explained in detail with reference to the accompanying drawing.

Figure 1:
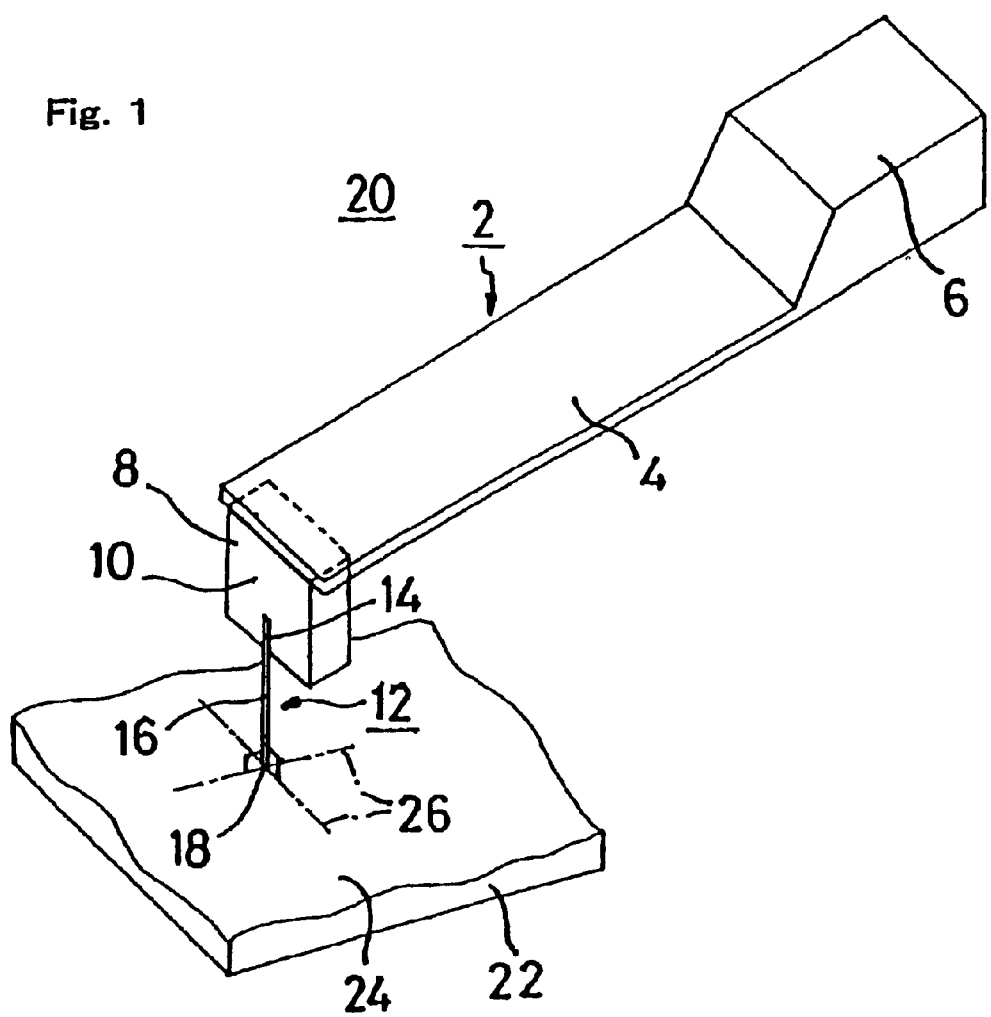
FIG. 1 is a perspective view which shows first mode (fixing plane) of the present invention.

FIG. 1 is a perspective view which shows first mode of the present invention. A cantilever for the vertical scanning type microscope 2 (hereafter called cantilever) comprises a cantilever portion 4, a fixing portion 6 and a protruding portion 8. The protruding portion 8 is set to protrude in cubic state at the tip end of the cantilever portion 4, and the protruding portion itself does not possess a sharp tip end like probe needle.

A surrounding surface of the protruding portion 8 comprises plural planes and at least one of the planes is a fixing plane 10 for a nanotube 12. The feature of this fixing lane 10 is in that its height direction is disposed, in measuring state, to be perpendicular against a specimen surface 26 shown by chain lines. The base end portion 14 of the nanotube 12 is fastened to this fixing plane in the height direction.

As the nanotube 12, there are several nanotubes, such as a conductive carbon nanotube, insulation BN(boron nitride) series nanotubes, BCN(boron carbon nitride) series nanotubes. For a tunnel microscope(STM), a conductive nanotube is used in order to detect tunnel current, and for an atomic force microscope(AFM), either a conductive nanotube or a insulation is selected according to an aim of use.

For a method to fasten the nanotube 12 to the fixing plane 10, there are two method, as was already explained. First method is a method that coats the base end portion 14 of the nanotube 12 with a coating film, and second method is a method that adheres the base end portion 14 to the fixing plane 10 by means of heat-fusion welding using an electron beam or an ion beam and or electric current.

The nanotube 12 is fastened to the fixing plane 10 so that the axis line stands to be perpendicular against the mean surface 26 of a specimen 22. The tip end portion 16 of the nanotube 12 thus fastened, is always kept to be perpendicular against the mean surface 26 in a measuring state, and by using the tip end 18, a detection efficiency for the specimen surface 24 increases.

A probe 20 for the vertical scanning type microscope (hereafter abbreviated as probe) is accomplished by fastening the nanotube 12 to the cantilever 2. This probe is utilized for a scanning type microscope and is to obtain substance information of a specimen at the atomic level of the specimen from the surface of a specimen, by means of scanning-detection of physical and chemical actions using a probe needle. As for the probes, there are, for examples, not only the above-described AFM and STM, but also a level force microscope (LFM) which detects differences of a surface by means of friction force, a magnetic force microscope (MFM)

which detects magnetic interaction, an electric-field force microscope(EFM) which detects a gradient of an electric field, and a chemical force microscope (CFM) which images surface distribution of chemical function groups.

Figure 2:
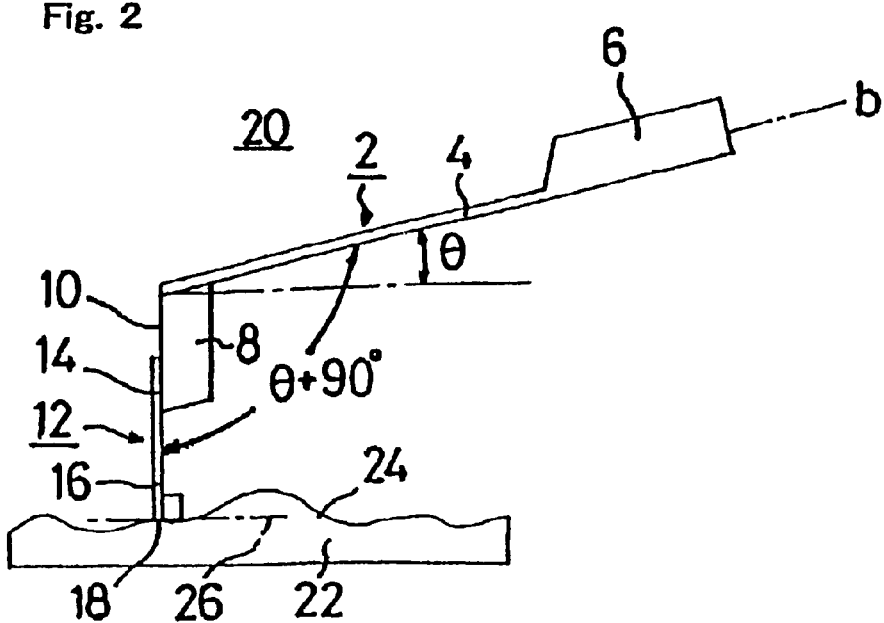
FIG. 2 is a side view which shows first mode of the present invention.

FIG. 2 is a side view of the first mode. When the probe 20 is set in the measuring state for a specimen 22, the axis direction b of the cantilever portion 4 is slant in a backward rising fashion, by an angle θ against the mean surface 26 of a specimen. In the slant disposition state, the axis center of the nanotube 12 and the axis direction b of the cantilever across each other at the angle (θ+90) so that the nanotube 12 is set perpendicularly at a right angle against the mean surface 26.

When the nanotube 12 is set perpendicularly to the mean surface 26 of the specimen, it means that the tip end 18 can exactly follow a complex projections and indentations on the specimen surface 24. That is, since the tip end 18 serves as a tip end of a probe needle, physical and chemical information of the surface of a specimen can be exactly detected at a high resolution.

Figure 3:
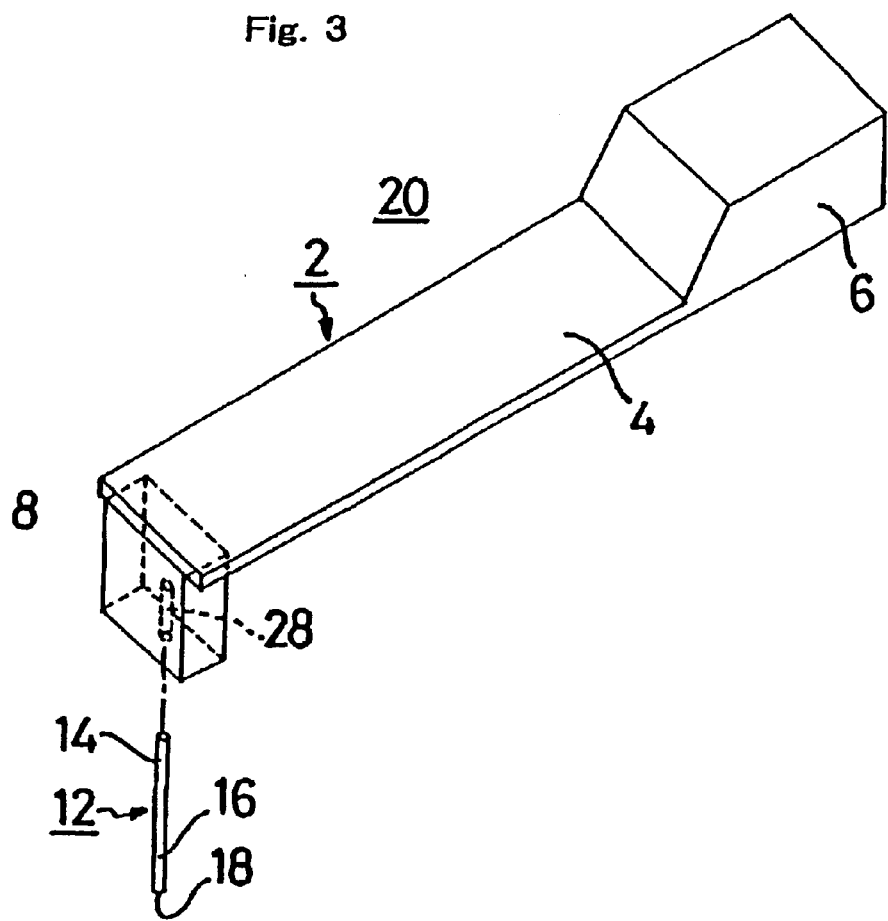
FIG. 3 is a perspective view which shows second mode (fixing hole) of the present invention.

FIG. 3 is a perspective view which shows the second mode of the present invention. The description for the parts, of which action effects are same as those in the first mode, will be omitted by numbering the same numbers as the first mode, and only different parts will be explained. In this mode, the fixing hole 28 is formed at the protruding portion 8. This fixing hole 28 is formed so that the axis direction of the fixing hole 28 is perpendicular to the mean surface 26 of a specimen, when the probe 20 is set in a measuring state.

The base end portion 14 of the nanotube 12 is inserted into the fixing hole 28 and is fastened there. The nanotube 12 can be fastened only by being inserted into the fixing hole 28, owing to atomic force. However, when the sectional diameter of the fixing hole 28 is large compared with that of the nanotube 12, the nanotube can be certainly fastened by means of filling up the hole with a resolution deposit of an organic gas, by means of irradiating a electron beam, by means of a surface fusion-welding using a electric current, etc.

Figure 4:
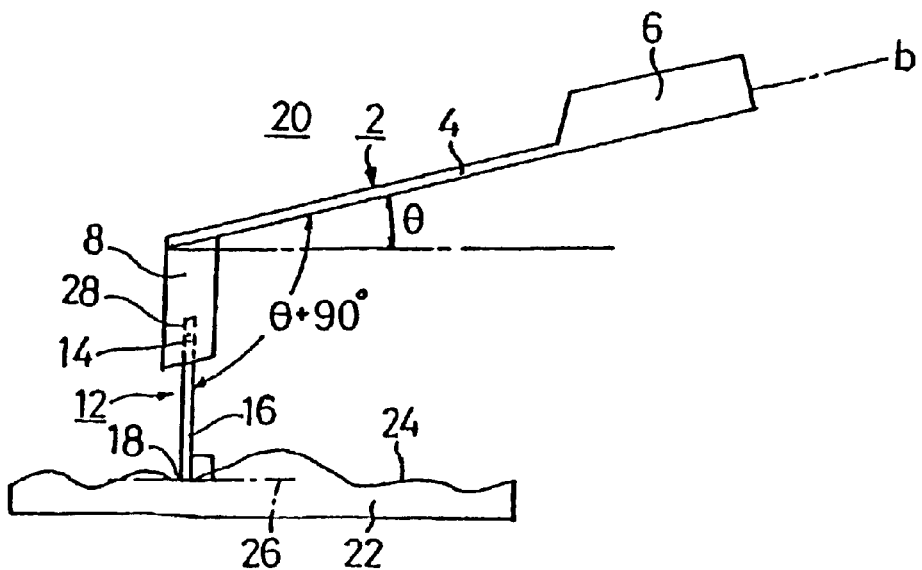
FIG. 4 is a side view which shows second mode of the present invention.

FIG. 4 is a side view showing the second mode. When the probe 20 is in a measuring state, the situation is same as the first mode in that the axis direction b of the cantilever portion 4 is slant in a backward rising fashion by an angle θ against the mean surface 26 of a specimen. However, in this slant disposition, since the axis center direction (height direction) of the nanotube 12 opens by the angle (θ+90) from the axis direction of the cantilever portion 4, the nanotube 12 abuts perpendicularly against the means surface 26 of the specimen. Accordingly the tip end 18 can exactly follows in accord with projections and indentations on the surface of a specimen 24.

Figure 5:
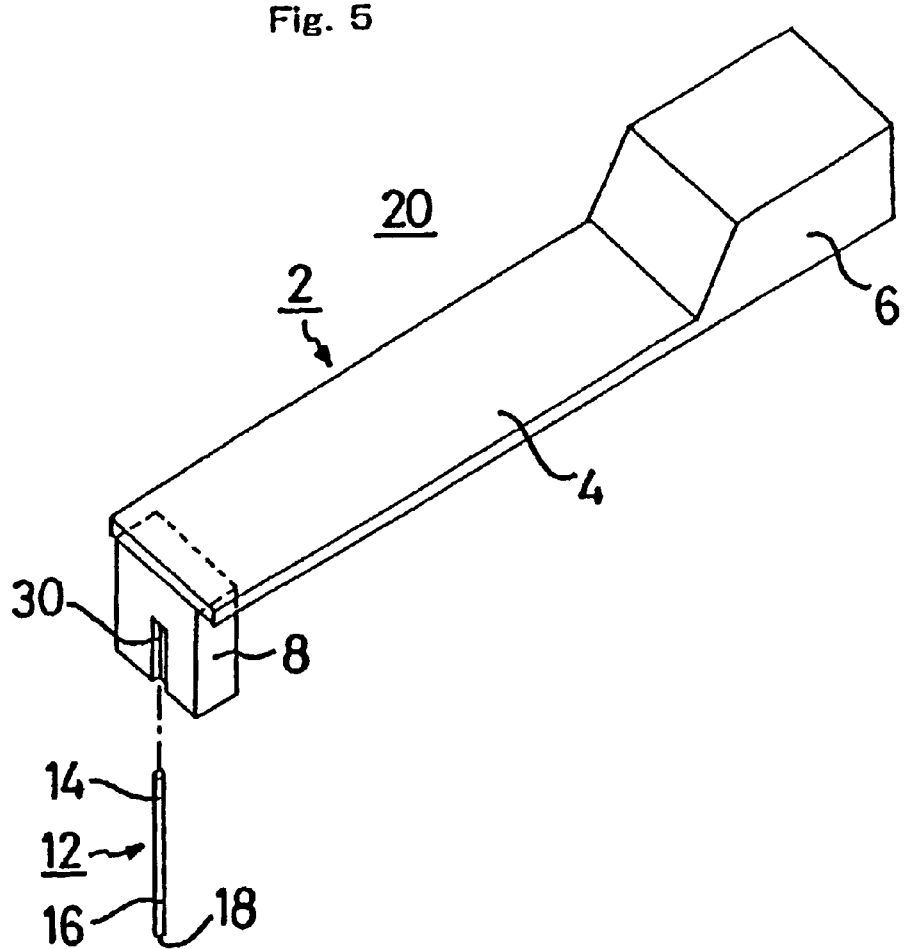
FIG. 5 is a perspective view which shows third mode (fixing gap) of the present invention.

FIG. 5 is a perspective view showing the third mode of the present invention. The description for the parts, of which action effects are same as those in the first mode, will be omitted by numbering the same numbers as the first mode, and only different parts will be explained. In this mode, the fixing gap 30 is engraved on the surface of protruding portion 8, and the base end portion 14 of the nanotube 12 is fitted in the this fixing gap 30. In order to make this fitted-insertion tight fastening, various method maybe used such as method to form a coating film so as to cover the surface, to apply a beam or to fusion-welding the surface by an electric current. As to the section shape of the fixing gap 30, there are several shapes such as the U-shape, the V-shape, the semi-circle shape, etc.

Figure 6:
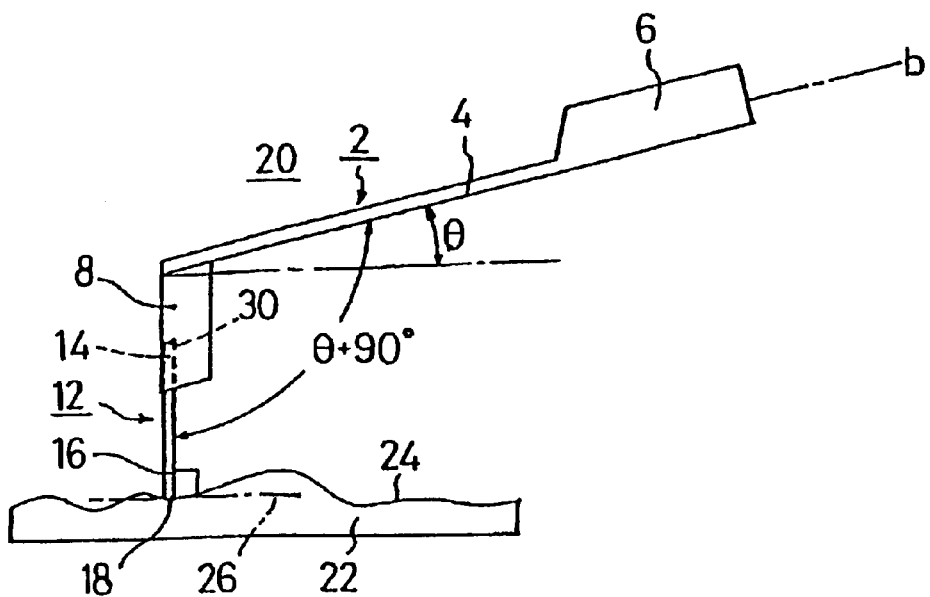
FIG. 6 is a side view which shows third mode of the present invention.

FIG. 6 is a side view showing the third mode. As shown in the diagram, the axis direction b of the cantilever portion and the axis center of the nanotube 12 are set up so as to open by the angle (θ+90). That is, the gap direction (height direction) of the fixing gap 30 is set up so as to open by the angle (θ+90) against the cantilever portion 6. As the result, the nanotube 12 abuts perpendicularly at the angle 90 against the mean surface 26 of a specimen, since the angle of the backward rising shape of the cantilever portion 6 is θ. Accordingly, the tip end 18 of the nanotube 12 can certainly follow projections and indentations on the specimen surface 24, and can detect, with a high degree of accuracy, substance information of the surface of a specimen.

Figure 7:
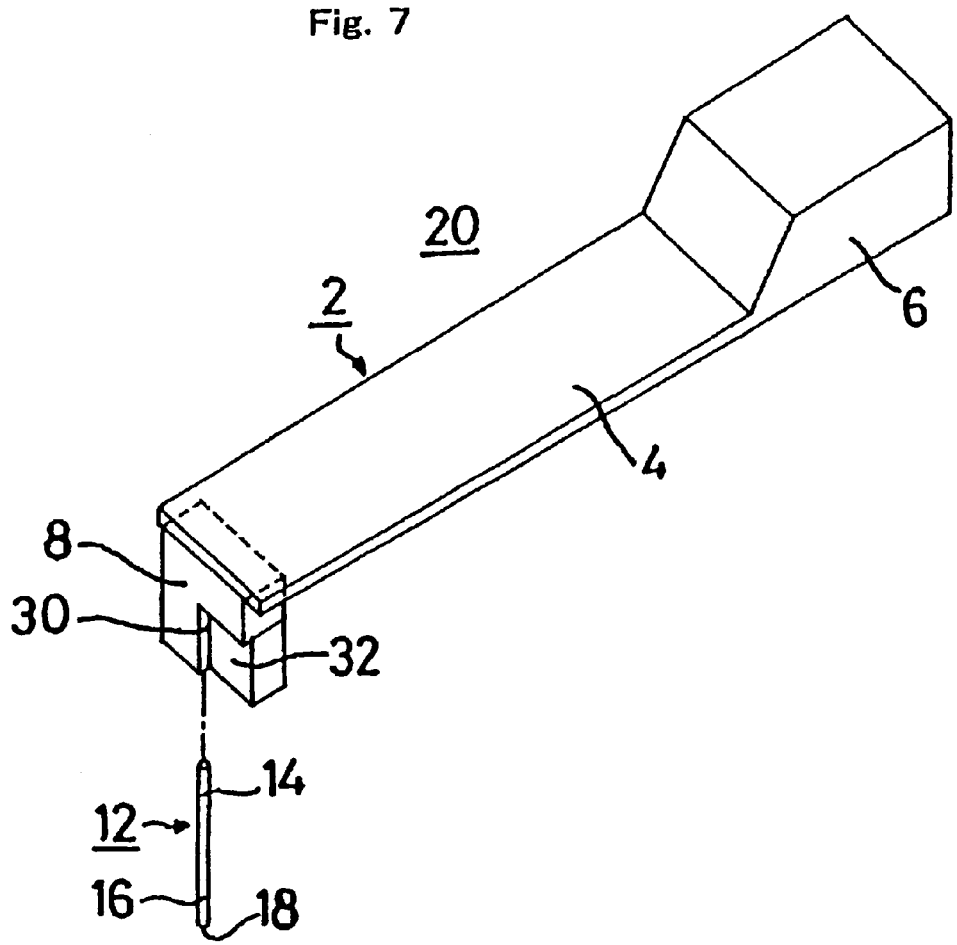
FIG. 7 is a perspective view which shows fourth mode (a modified example of fixing gap) of the present invention.

FIG. 7 is a perspective view showing the fourth mode of the present invention. The description for the parts, of which action effects are same as those in the first mode, will be omitted by numbering the same numbers, and only different parts will be explained. In this mode, a plain cut-deficient portion 32 is formed on the surface of the protruding portion 8 and the step portion 32a of the cut-deficient portion 32 constitutes the fixing gap 30. The fixing gap 30 is a general term of the places into which the nanotube 12 can be uniquely fitted, and the fixing gap includes various shapes such as a gap shape, a step shape, etc.

The base end portion 14 of the nanotube 12 is fitted and is fastened to the fixing gap 30 of this step shape. A coating film or a fusion-welding, etc. are utilized as the fastening method. In order to abut perpendicularly the nanotube 12 against the mean surface 26 of a specimen, the axis direction of the fixing gap 30 is formed so as to be perpendicular to the mean surface 26 of the specimen in a measuring state.

Figure 8:
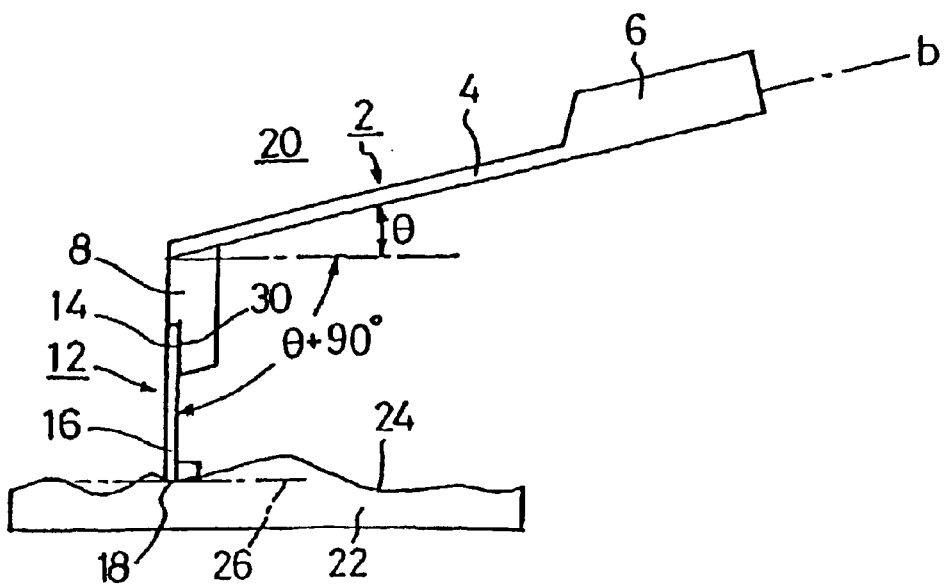
FIG. 8 is a side view which shows fourth mode of the present invention.

FIG. 8 is a side view showing the fourth mode. The angle θ of the backward rising shape of the cantilever portion 4 and the opening angle (θ+90) between the cantilever portion 4 and the nanotube 12 are same as previously described, so that those will not be repeatedly mentioned here.

Figure 9:
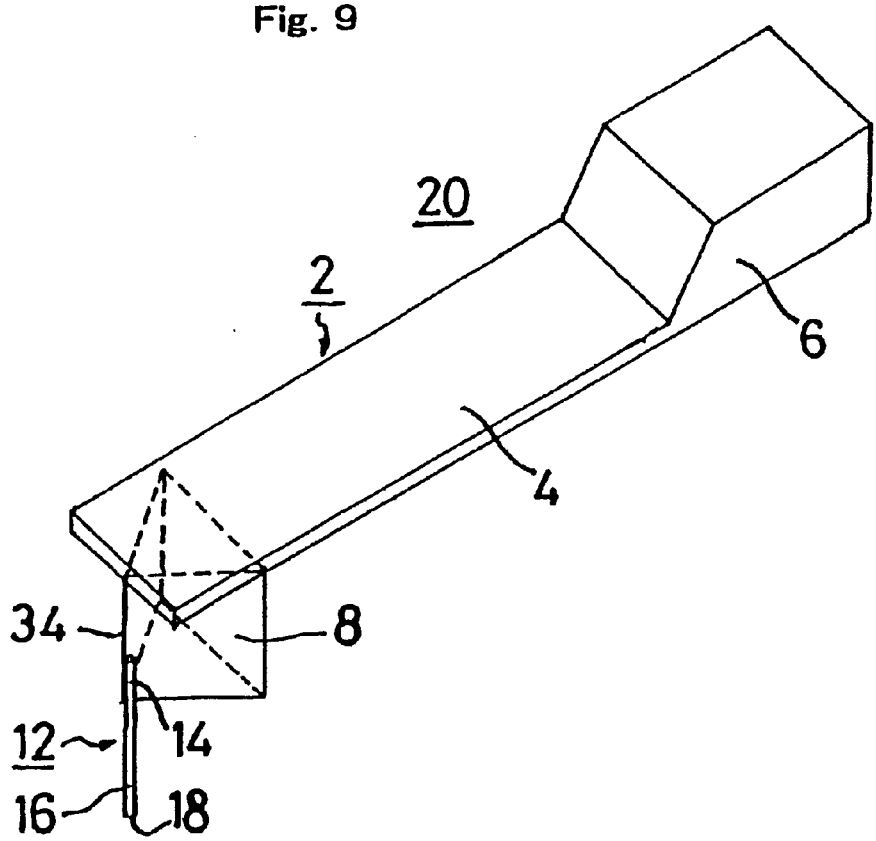
FIG. 9 is a perspective view which shows fifth mode (edge line portion) of the present invention.

FIG. 9 is a perspective view showing the fifth mode of the present invention. The description for the parts, of which action effects are same as those in the first mode, will be omitted by numbering the same numbers, and only different parts will be explained. In this mode, the protruding portion 8 is formed in a triangular prism shape and a edge line 34 is showing the fixing place of the nanotube 12. That is, as the direction of the edge fine is the fixing direction, the nanotube 12 is fastened in parallel with the edge line in a neighboring place of the edge line.

Figure 10:
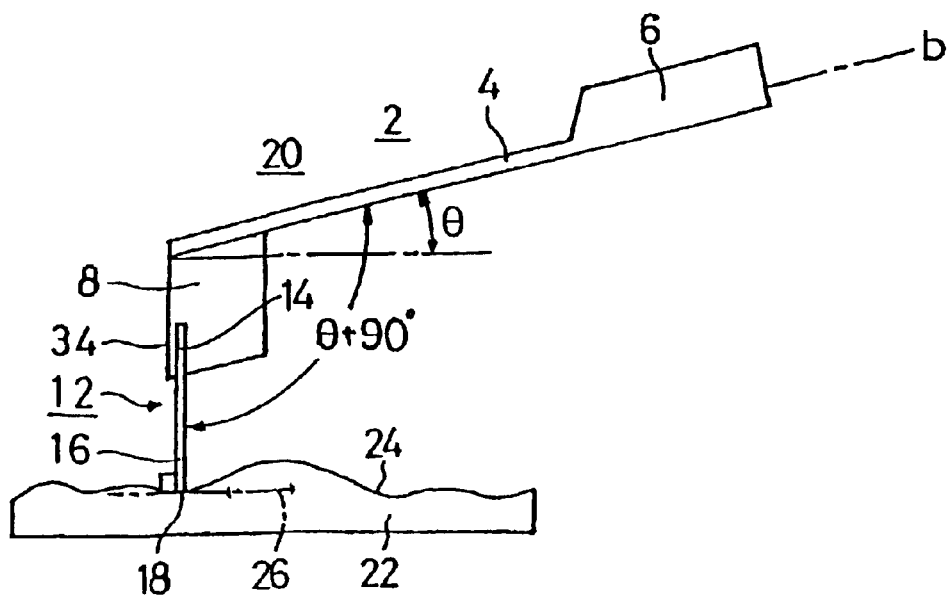
FIG. 10 is a side view which shows fifth mode of the present invention.

FIG. 10 is a side view showing the fifth mode. The direction of the edge line 34 and the axis center of the nanotube 12 are parallel with each other in a adjacent state and are set perpendicularly to the mean surface 26 of the specimen. Explanations for the other things are omitted, since these are same as other modes.

Figure 11:
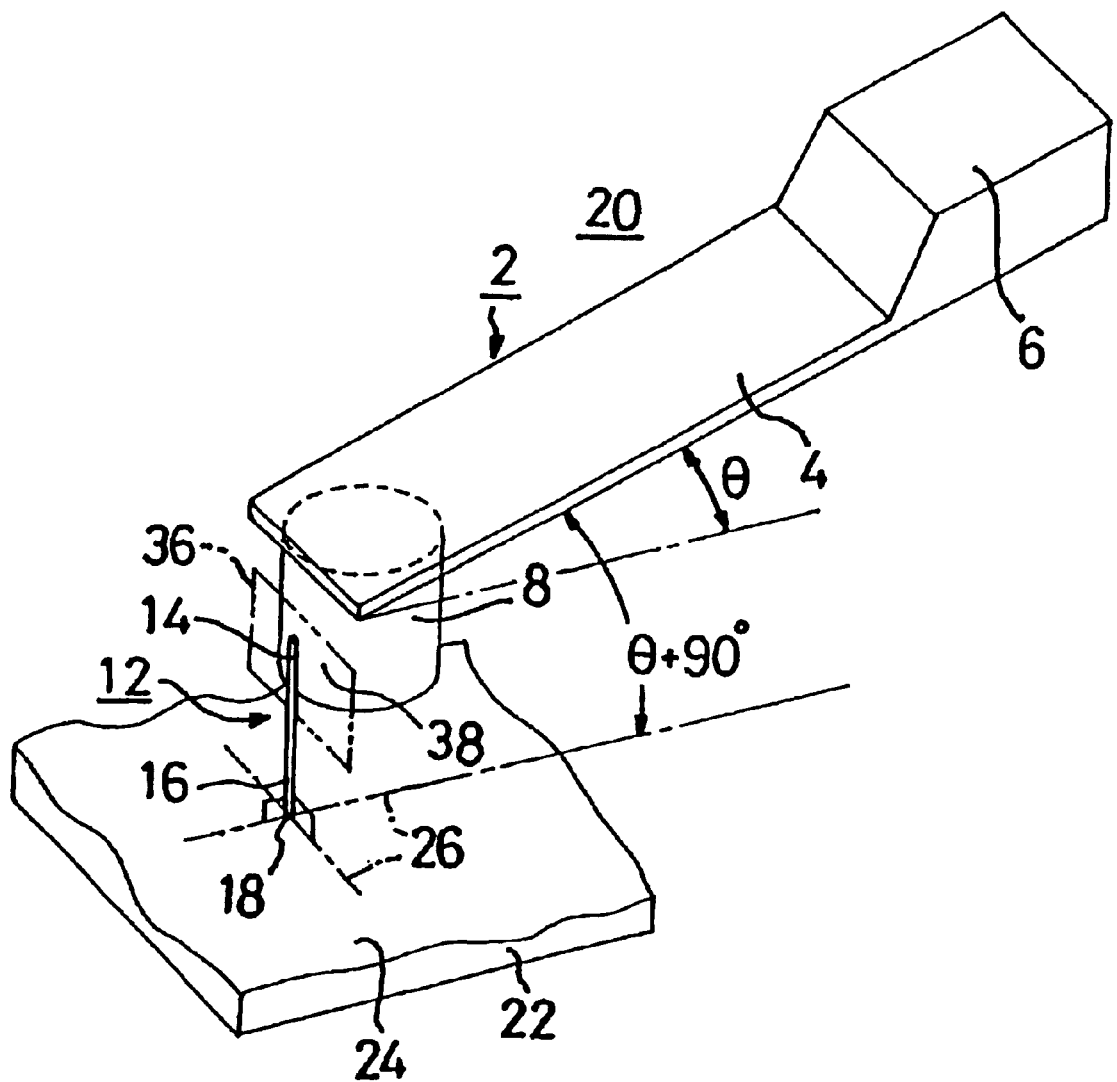
FIG. 11 is a perspective view which shows sixth mode of the present invention.

FIG. 11 is a perspective view showing the six mode. The shape of the protruding portion 8 is cylindrical shape, the surrounding surface is a curved surface 38 to which the nanotube 12 is fastened. The height direction of a tangent plane 36, which is disposed in an arbitrary place, is set perpendicularly to the mean surface 26 of a specimen The base end portion 14 of the nanotube 12 is fastened to the place of a tangent line of the tangent plane 36 with the fixing curved-surface 38. Then the tip end portion 16 is substantially perpendicular to the mean surface 26, and a crossing angle between the cantilever portion 4 and the nanotube 12 is (θ+90), by expressing the backward rising angle as θ.

Figure 12:
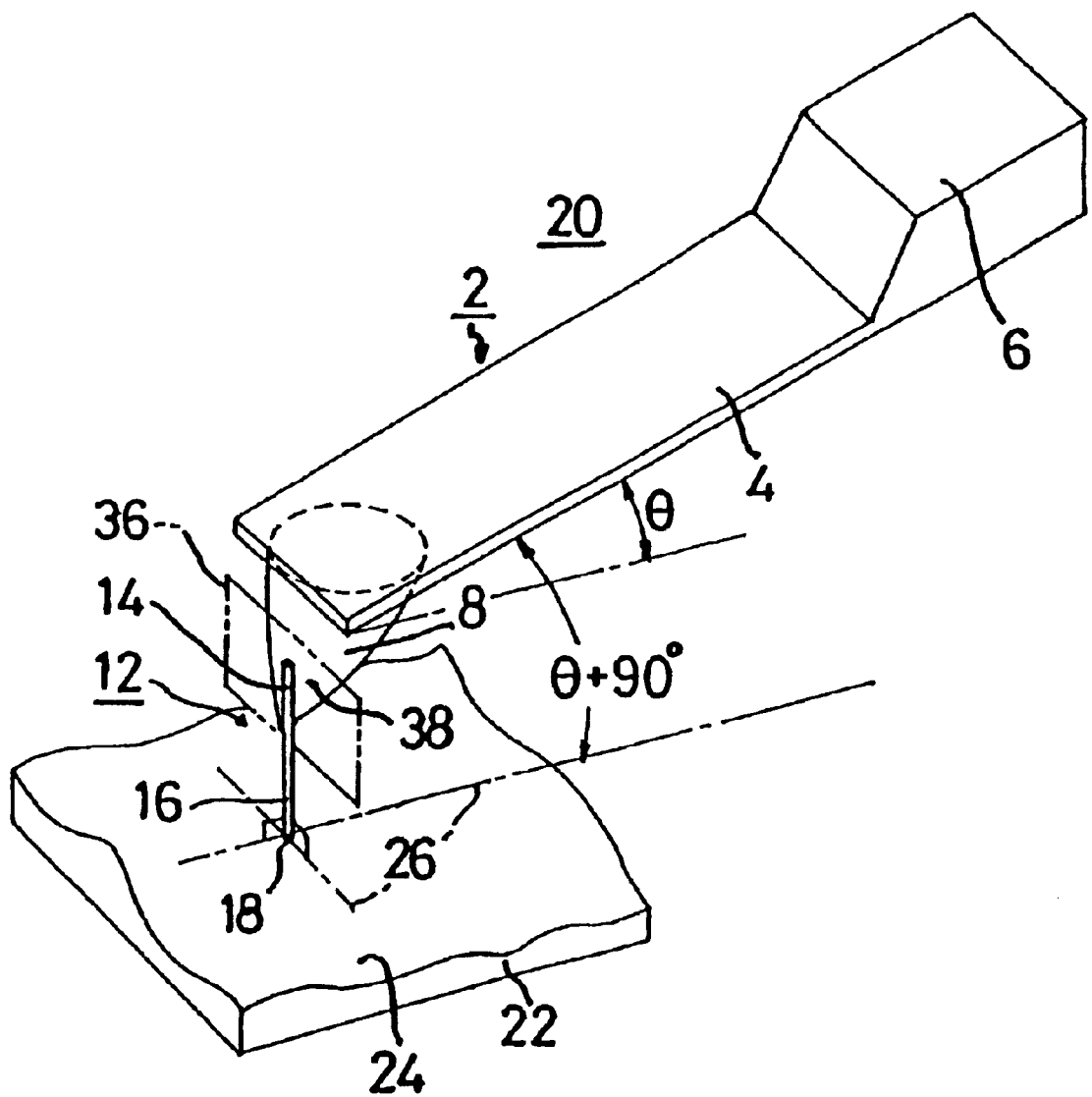
FIG. 12 is a perspective view which shows seventh mode of the present invention.

FIG. 12 is a perspective view showing the seventh mode. The shape of the protruding portion 8 is an obliquely cut cylindrical form, and a large area portion among the surrounding surfaces is the fixing curved-surface 38 to which the nanotube 12 is fastened. The height direction of the tangent plane 36 which is provided in the fixing curved-surface 38 so as to be perpendicular to the mean surface 26 of a specimen. The base end portion 14 of the nanotube 12 is fastened at the place of the tangent line where the tangent plane 36 contacts with the fixing curved-surface 38. Then, the tip end portion 16 is perpendicular to the mean surface 26 of a specimen, so that detection of high resolution for the specimen is achieved. As shown in the diagram, expressing the backward rising angle of the cantilever portion 4 as θ, the crossing angle of the cantilever portion 4 and the nanotube 12 is caused to be the degree (θ+90).

Figure 13:
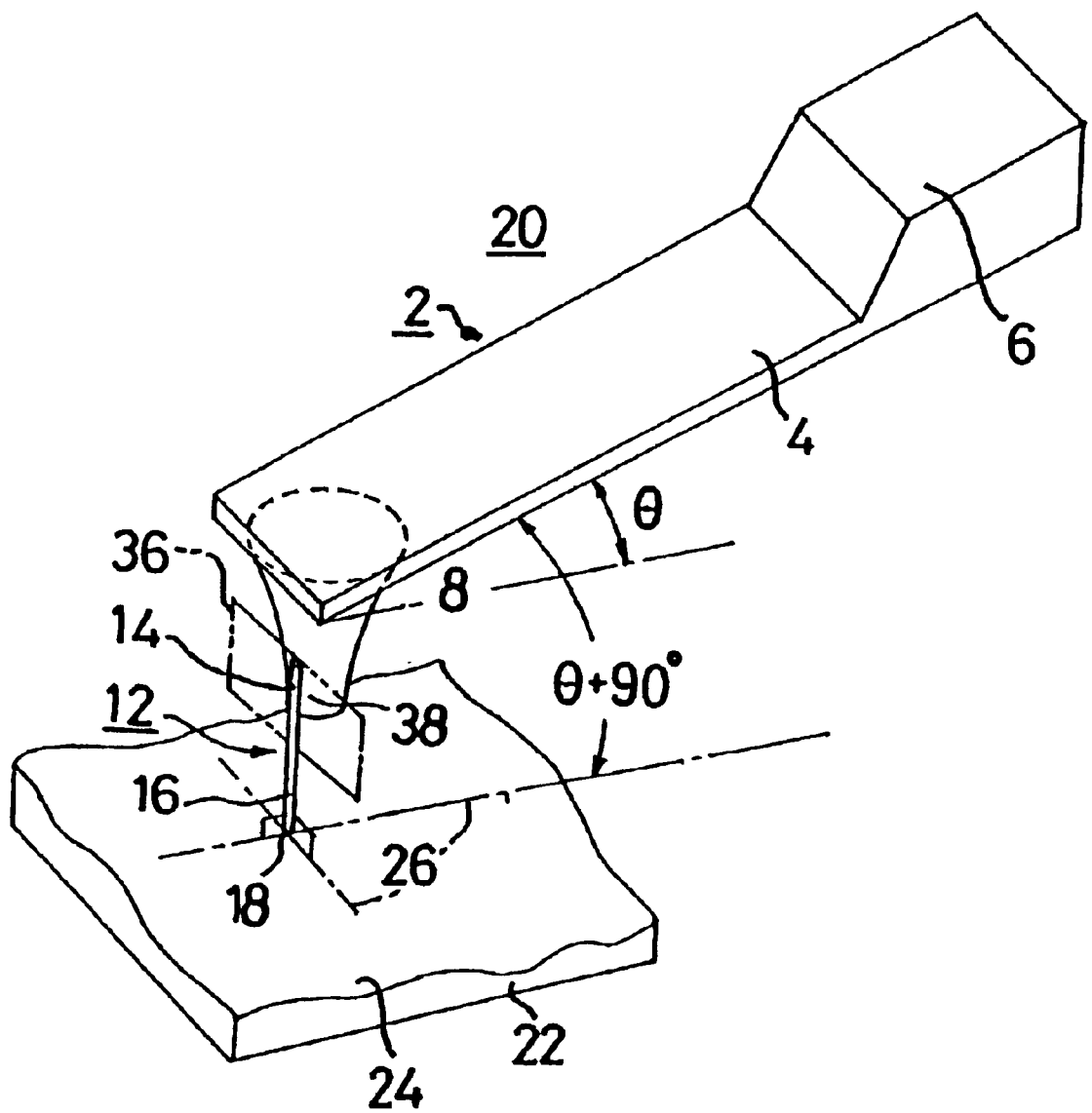
FIG. 13 is a perspective view which shows eighth mode of the present invention.
Figure 14:
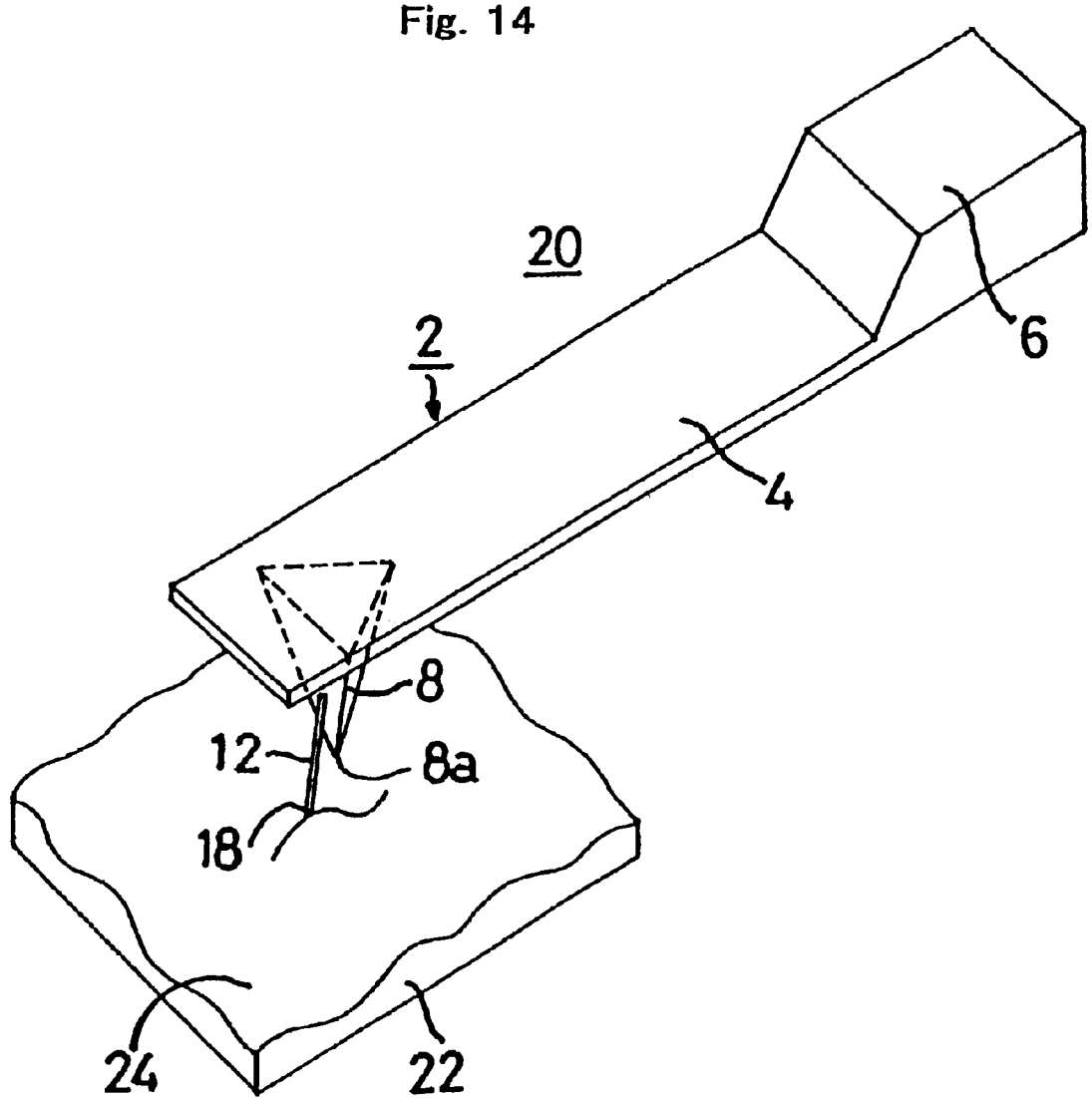
FIG. 14 is a stereo-structure diagram which shows a probe for a conventional scanning type microscope.
Figure 15:
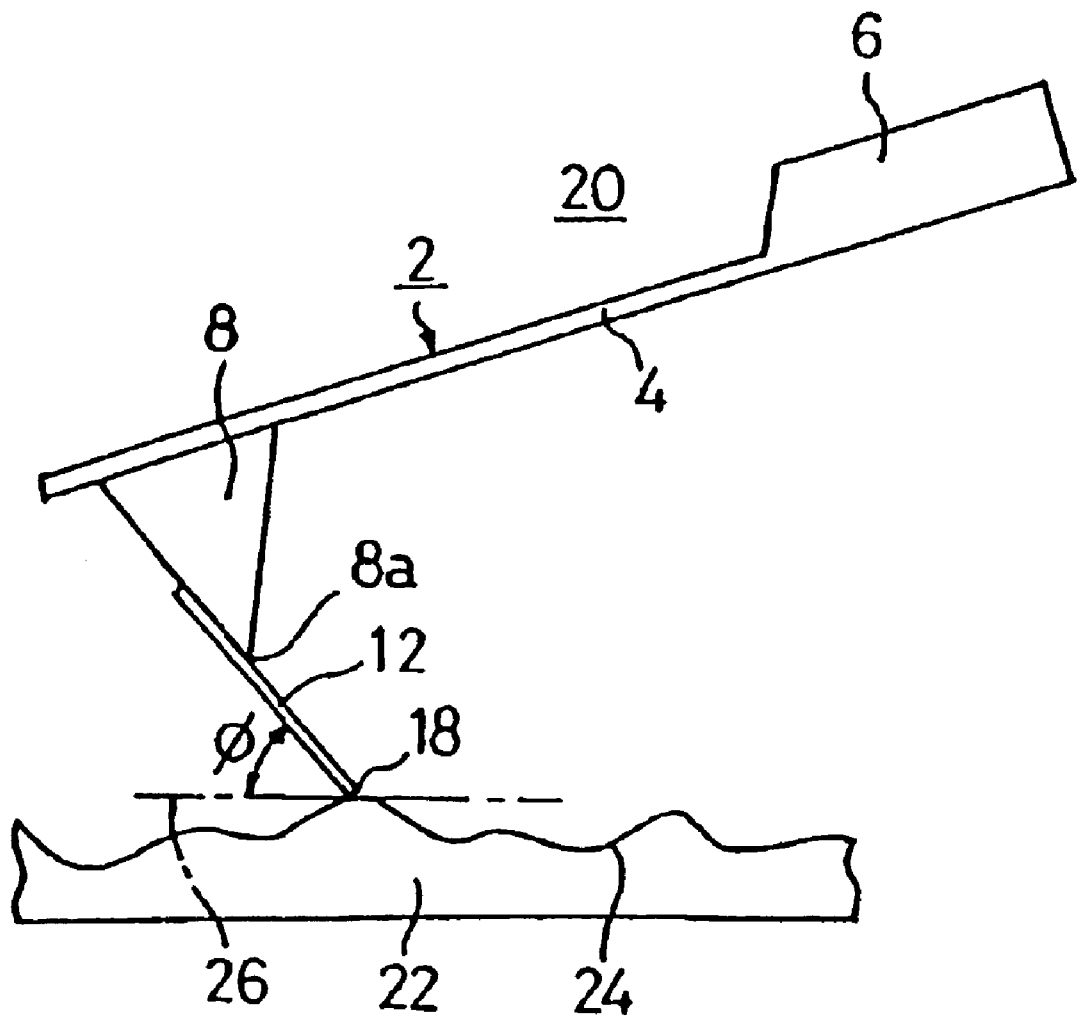
FIG. 15 is a stereo-structure diagram which shows a probe for a conventional another scanning type microscope.

FIG. 13 is a perspective view showing the eighth mode. The form of a protruding portion 8 is a truncated-cone, and the surrounding surface in the lower end region of the truncated-cone is the fixing curved-surface 38 to which the nanotube 12 is fastened. The height direction of the tangent plane 36 provided to this fixing curved-surface 38 is set to be perpendicular to the mean surface of a specimen. The base end portion 14 of the nanotube 12 is fastened to the place of a tangent line of the tangent plane 36 with the fixing curved-surface 38. Then, the tip end portion 16 is perpendicular to the mean surface 26 of the specimen and high resolution detection for the specimen is achieved As shown in the diagram, expressing the backward rising angle of the cantilever portion 4 as θ, the crossing angle of the cantilever portion 4 and the nanotube 12 is caused to be the degree (θ+90).

In the present invention, a sharp tip end is not formed at the protruding portion 8 of the cantilever 2, since the tip end works as a probe needle so that the action of the probe needle of a nanotube fastened later is caused to be wrong. The nanotube 12 which serves as a probe needle is fastened to this protruding portion 8. Since his fixing portion is set so that this directions is perpendicular to the mean surface 26 of the specimen in a measuring state, the fastened nanotube 12 is also naturally set to be perpendicular to the mean surface 26 of the specimen. Owing to this perpendicular disposition, the nanotube 12 can capture a sharp image of the surface of the specimen.

In order to form the fixing plane 10, the fixing hole 28, the fixing gap 30, the edge line portion 34 or the fixing curved-surface 38 in the protruding portion 8, an etching or a deposition may be used by means of a focused ion-beam or an electron beam, and also an etching or a deposition in the general semiconductor technique.

The present invention is not limited to the above described embodiments; and various modifications and design changes, etc. within this limits that involve no departure from the technical spirit of the present invention are included in the scope of the present invention.

INDUSTRIAL APPLICABILITY

According to the present invention of claim 1, since a fixing region is formed on a cantilever so that the fixing region is substantially perpendicular to a surface of a specimen in a measuring state, an excellent cantilever for a vertical scanning type microscope can be provided, wherein a vertical type probe can be made only by fastening a nanotube to this fixing region in the height direction, and so on.

According to the present invention of claim 2, since a fixing plane is formed on a cantilever so that the fixing plane is substantially perpendicular to the surface of the specimen in a measuring state, an excellent cantilever for a vertical scanning type microscope can be provided, wherein a vertical type probe can be made only by fastening a nanotube to this fixing plane in the height direction, and so on.

According to the present invention of claim 3, since a fixing hole is formed in a cantilever so that the fixing hole is substantially perpendicular to the surface of the specimen in a measuring state, an excellent cantilever for a vertical scanning type microscope can be provided, wherein a vertical type probe can be made only by insert-fastening a nanotube into this fixing hole, and so on.

According to the present invention of claim 4, since a fixing gap is formed in a cantilever so that the fixing gap is substantially perpendicular to the surface of the specimen in a measuring state, an excellent cantilever for a vertical scanning type microscope can be provided, wherein a vertical type probe can be made only by fit-fastening a nanotube in his fixing gap, and so on.

According to the present invention of claim 5, since an edge line portion is formed on a cantilever so that the edge line portion is substantially perpendicular to the surface of the specimen in a measuring state, an excellent cantilever for a vertical scanning type microscope can be provided, wherein a vertical type probe can be made only by fastening a nanotube to this edge line portion, and so on.

According to the present invention of claim 6, by forming a fixing curved-surface on a cantilever, and only by fastening a nanotube to a tangent plane of this fixing curved-surface in the height direction, a cantilever for a vertical scanning type microscope is provided in which the nanotube can be disposed so as to be substantially perpendicular to the surface of the specimen.

According to the present invention of claim 7, the above described fixing region, more concretely saying, a fixing plane, a fixing hole, a fixing gap, a edge line portion or a fixing curved-surface, etc. are easily formed, by means of a focused-ion-beam process, an etching process or a deposition process.

According to the present invention of claim 8, since a fixing region, of which the height direction is perpendicular to the surface of the specimen, is set up on the cantilever and the base end portion of a nanotube is fastened in the height direction to this fixing region, a probe for a vertical scanning type microscope is provided, wherein a tip end of a probe needle always abuts perpendicularly against the surface of the specimen and can detect and obtain an image of the surface of the specimen at a high resolution.

According to the present invention of claim 9, a probe for a vertical scanning type microscope is provided, which can certainly follow projections and indentations on the surface of the specimen, only by rising a backward of the cantilever portion by an angle θ in a measuring state, since an axis line of a nanotube and an axis direction of the cantilever are constructed so that the opening angle is about a degree (θ+90).

What is claimed is:

1. A cantilever for a vertical scanning type microscope which obtains substance information of a surface of a specimen by a tip end of a nanotube probe needle fastened to said cantilever, characterized in that said cantilever is provided with a fixing region to which a base end portion of a nanotube serving as a probe needle is fastened by a coating film due to electron beam irradiation or a fusion bonding due to either electron beam irradiation or flowing current, and a height direction of said fixing region is caused to be substantially perpendicular to a mean surface of said specimen when said cantilever is disposed in a measuring state with respect to said mean surface of said specimen.

2. The cantilever for a vertical scanning type microscope according to claim 1, wherein said fixing region is a fixing plane.

3. The cantilever for a vertical scanning type microscope according to claim 1, wherein said fixing region is a fixing hole into which a tip end of said nanotube is inserted, and an axis direction of said fixing hole is set so as to accord with said height direction.

4. The cantilever for a vertical scanning type microscope according to claim 1, wherein said fixing region is a fixing gap to which a tip end of said nanotube is fitted, and an gap direction of said fixing gap is set so as to accord with said height direction.

5. The cantilever for a vertical scanning type microscope according to claim 1, wherein said fixing region is an edge line portion, and a direction of said edge line portion is set so as to accord with the said height direction.

6. The cantilever for a vertical scanning type microscope according to claim 1, wherein said fixing region is a fixing curved-surface; and when said cantilever is disposed in a measuring state with respect to said mean surface of said specimen, a height direction of a tangent plane of said fixing curved-surface is set to be substantially perpendicular to said mean surface of said specimen.

7. The cantilever for a vertical scanning type microscope according to claim 1, wherein said fixing region is formed by means of one process selected from the group consisting of a focused-ion-beam process, an etching process, and a deposition process.

8. A probe for a vertical scanning type microscope which obtains substance information of a surface of a specimen by means of a tip end of a nanotube probe needle fastened to a cantilever, said probe being characterized in that: a fixing region to which a base end portion of a nanotube serving as a probe needle is fastened is provided on said cantilever; a height direction of said fixing region is set to be substantially perpendicular to a mean surface of said specimen; when said cantilever is disposed in a measuring state with respect to said mean surface of said specimen; and said base end portion of said nanotube is fastened in a height direction of said fixing region by a coating film due to electron beam irradiation or a fusion bonding due to either electron beam irradiation or flowing current.

9. The probe for a vertical scanning type microscope according to claim 8, wherein an angle of an axis line of said nanotube against an axis direction of a cantilever portion of said cantilever is caused to be substantially ($\theta$+90) degrees, when said axis direction of said cantilever portion is disposed in a backward rising state by an angle $\theta$ with respect to said mean surface of said specimen in said measuring state.

* * * * *